United States Patent
Jakúbek et al.

(10) Patent No.: US 10,261,199 B2
(45) Date of Patent: Apr. 16, 2019

(54) IONIZING RADIATION DETECTOR MODULE

(71) Applicant: ADVACAM S.R.O., Prague (CZ)

(72) Inventors: Jan Jakúbek, Hýskov (CZ); Martin Jakúbek, Lysá nad Labem (CZ); Pavel Soukup, Prague (CZ)

(73) Assignee: ADVACAM S.R.O., Prague (CZ)

( * ) Notice: Subject to any disclaimer, the term of this patent is extended or adjusted under 35 U.S.C. 154(b) by 73 days.

(21) Appl. No.: 15/572,818

(22) PCT Filed: May 10, 2016

(86) PCT No.: PCT/CZ2016/000054
§ 371 (c)(1),
(2) Date: Nov. 9, 2017

(87) PCT Pub. No.: WO2016/180382
PCT Pub. Date: Nov. 17, 2016

(65) Prior Publication Data
US 2018/0113224 A1    Apr. 26, 2018

(30) Foreign Application Priority Data
May 12, 2015    (CZ) .................................... 2015-318

(51) Int. Cl.
*G01T 1/24*    (2006.01)

(52) U.S. Cl.
CPC .............. *G01T 1/243* (2013.01); *G01T 1/244* (2013.01); *G01T 1/247* (2013.01)

(58) Field of Classification Search
CPC ...................................................... G01T 1/243
See application file for complete search history.

(56) References Cited

U.S. PATENT DOCUMENTS 4,338,521 A * 7/1982 Shaw .................... G01T 1/2018
250/367

5,991,357 A * 11/1999 Marcovici .............. A61B 6/035
250/370.09

(Continued)

FOREIGN PATENT DOCUMENTS

CZ        304899 B6     1/2015
EP        0291351 A1    11/1983
(Continued)

OTHER PUBLICATIONS

Vavrik, D., et al. "Molecular pixelated detector system with the spectroscopic capability and fast parallel read-out" at the 15th International Workshop on Radiation Imaging Detectors, poblikováno Sep. 6, 2014.

(Continued)

*Primary Examiner* — Christine S. Kim
(74) *Attorney, Agent, or Firm* — Mark M. Friedman

(57) ABSTRACT

A module (1) for a detector (14) of ionizing radiation comprising at least two detection segments (2) for detecting ionizing radiation, attached to a row carrier (3) allowing for the assembly of detectors (14) with an unlimitedly large detection surface for continuous imaging of ionizing radiation. The construction of the module (1), including a means (10) for power supply stabilization for each detection segment (2), an interconnection of electrical conductors (8), formed by printed circuit boards (9, 13) led vertically downwards perpendicular to the detector surface along the row carrier (3), and a parallel connection to the connectors (11) of the read-out electronics, increases the reliability and speed of the operation of the detector (14). Between the individual parts of the module (1) there are formed thermal bridges to stabilize the temperature and to increase the reliability of the detector (14) assemblies from the modules (1).

18 Claims, 6 Drawing Sheets

(56) References Cited

U.S. PATENT DOCUMENTS

| | | | |
|---|---|---|---|
| 6,403,964 B1* | 6/2002 | Kyyhkynen | H04N 5/379 250/370.09 |
| 9,000,382 B2* | 4/2015 | Mattson | G01T 1/00 250/363.01 |
| 2012/0069956 A1* | 3/2012 | Guery | A61B 6/032 378/19 |
| 2013/0114786 A1* | 5/2013 | Ikhlef | A61B 6/032 378/19 |
| 2014/0307850 A1 | 10/2014 | Poorter et al. | |
| 2017/0025463 A1* | 1/2017 | Bologna | H01L 31/0203 |

FOREIGN PATENT DOCUMENTS

| | | |
|---|---|---|
| EP | 1471368 A1 | 10/2004 |
| EP | 1920465 B1 | 3/2015 |
| WO | 2006119786 A1 | 11/2006 |
| WO | 2015027968 A1 | 3/2015 |

OTHER PUBLICATIONS

Takahiro Fusayasu "TPC Development by the LCTPC Collaboration for the ILD Detector at ILC". Nuclear Science Symposium and Medical Imaging Conference (NSSIMIC), 2011 IEEE, IEEE, Oct. 23, 2017, pp. 1413-1416, XP032121602, DOI:10.1109/NSSMIC.2011.6154340.

Jakubek J et al "Large Area Pixel Detector Widepix With Full Area Sensitivity Composed of 100 Timepix Assemblies With Edgeless Sensors", Journal of Instrumentation, Institute of Physics Publishing, Bristol, GB vol. 9, No. 4, Apr. 16, 2014, XP020261436, ISSN:1748-0221, DOI:10.1088/1748-0221/9/04/C04018.

Brezina C et al. "GOSSIPO-4: Evaluation of a Novel PLL-Based TDC-Technique for the Readout of Gridpix-Detectors" IEEE Transaction on Nuclear Science, IEE Service Centre, New York, NY, US, vol. 61 No. 2, Apr. 1, 2014/ XP011545175. DOI:10.1109/TNS.2014.2301141.

* cited by examiner

IONIZING RADIATION DETECTOR MODULE

FIELD OF THE INVENTION

The invention relates to the electronic imaging of ionizing radiation detectors with a continuous detection surface.

BACKGROUND OF THE INVENTION

For the detection of ionizing radiation, hybrid pixel detectors are currently used which utilize, for example, chips known to the professional public under the names Medipix and Timepix. These chips have a sensor layer which is sensitive to ionizing radiation applied to the read-out chip, from the side of which there are connected electrical conductors for supplying power and transmitting communication signals. Among contemporary production, detection chips utilized have a standard-size detector surface which, excluding the non-sensitive periphery, reaches a maximum of several tens of square centimeters. Detection chips with a larger detector surface are not manufactured, because with larger detector surfaces there is a much higher occurrence of errors, making such manufacture unprofitable.

Some applications of the detector's use require that the detector surface of the detector have a area of up to hundreds of square centimeters while being capable of producing data so that the displayed image is continuous, without dividing edges between the individual detection chips—segments. In certain designs, the image from the array of the detection segments are corrected using software, while in other designs detection segments are used which have no edges (edgeless). These edgeless detection segments are arranged next to each other and their operation is synchronized to produce a clear resulting image of the detected ionizing radiation.

The disadvantages of existing designs consist in the fact that the arrangement of the detection segments next to each other is problematic, because sufficient space must be provided for connecting electrical conductors to the detection segments without disrupting the continuous detection surface.

The aforementioned disadvantages are resolved in Czech patent CZ 304899 which describes an ionizing radiation detector that allows for the creation of a continuous digital image using tightly arranged individual detection segments. The segments are tightly arranged side by side on row carriers, while the row carriers are then attached to a matrix. Each detection segment is mounted in a segment holder, wherein the sensor layer and its read-out chip preferably extend beyond the row carrier on one of the longer sides of the row carrier. The output conductors of the read-out chip of the detection segment lie in a horizontal plane on the opposite side of this overlap and are attached to electrical conductors for supplying power and transmitting the communication signals which lead along the entire row of the segments. The conductors comprise a non-sensor part of the row. The overlap is also used in the construction of a detector with a square or rectangular detector surface, in which the individual row carriers are arranged parallel to each other so that the overlaps cover the non-sensor part created by the electrical conductors of the adjacent row.

The disadvantages of this design lie in the fact that the space in the non-sensor area hidden beneath the overlap is limited. Electrical conductors are led along the row carrier in this limited space, and therefore a large number of segments can not be connected in a single row to the power supply and to the readout electronics. If, regarding the power supply connection, the power supply stabilization is too remote from the detection segments, fluctuations in the supply voltage occur and the detection segments operate erroneously, since these are very sensitive electronic components which depend on a stable power supply. Also, the limited space for electrical conductors allows for a connection to the readout electronics only serially or sequentially. A serial connection leads to longer response time and to slower image acquisition from the detector. In the presented invention, these problems are resolved by limiting the number of detection segments in a single row, wherein the mentioned electronics are arranged at the end of the row. This arrangement allows for the assembly of row carriers into continuous rectangular or square surfaces, the limitation being that the electronics are located at the two sides of the perimeter of the continuous detector surface.

The issue of the limitation of the total area is removed in patent application US 2014/0307850 which describes an ionizing radiation detector with a continuous detection surface. The detector also utilizes detection segments arranged tightly side by side, which are arranged on a rectangular matrix. The matrix has notches formed around its periphery for leading electrical conductors from each individual rows of detection segments. The electric conductors are similarly led along the detection segments and are directed into the notches, in which they are drawn vertically downwards below the matrix. The use of the notches removes the maximum size limit for the continuous detection surface, because matrices can be combined next to each other without interfering with the longitudinal lines of conductors of the individual matrices. The dead spot above each notch is occupied by a detection segment whose size and shape have been designed for this purpose.

The disadvantages of the design according to this application consist in the fact that due to the lack of space for storing conductors, the detection segments can not have their own communication channel and therefore are connected serially. This limitation in connecting has a negative impact on the data collection rate from the detection segments. Moreover, it is impossible to control the thermal stability of the power source and the detection segments. When connecting detection segments to an independent power source, a temperature difference occurs between the two parts which is difficult to compensate and has a negative effect on the stability of the power supply and the operation of the detection segments. Another disadvantage is that within the continuous surface, there form areas with limited sensitivity of detection, located above the vertical lead of electrical conductors beneath the matrix. Although the application describes the possibility of overlapping these areas with a detection segment, there is still a distortion in the detection of ionizing radiation which is difficult to eliminate even with the use of complicated software. The correction of data leads to inaccuracies and slows down the operation of the detector.

The objective of the invention is to create a module for the construction of ionizing radiation detectors with a continuous detector surface. The modules should allow for the completion of the detector in the form of a row, while the total number of detection segments in a row should not be limited. Alternatively, this would allow for the assembly of a detector with an unlimited rectangular or square detection surface. The modules would allow for both serial connection of the detection segments to the readout electronics but also for a high-speed parallel connection, or a combination thereof. Another significant feature of the invention should be the integration of power supplies into the structure of the detection module and their position in close proximity to the actual detection segments. This would remove the influence of temperature differences and would secure a stable power supply for the detection segments.

SUMMARY OF THE INVENTION

This objective is resolved by using a module for ionizing radiation detectors according to this invention.

The ionizing radiation detector module has at least two detection segments arranged side by side on a row carrier with clearance up to 30 µm to form a continuous detection surface. The row carrier is formed by a longitudinal profile having a cross-sectional shape of a square or rectangle, and on at least part of the upper base of the row carrier there are exchangeably arranged holders of the detection segments. The detection segment includes an elementary pixel detector consisting of a sensor layer sensitive to detecting radiation and which is arranged on the upper surface of the read-out chip. The read-out chip is asymmetrically attached to the holder by at least part of its lower surface while the rest of the lower surface of the chip exceeds the upper base of the row carrier. The elemental pixel detector is equipped with at least one output conductor led out horizontally from the side of the read-out chip to the upper base of the carrier for connecting to the power supply and transmitting communication signals to the electronics readout.

The summary of the invention consists in the fact that on the unoccupied surface of the upper base of the row carrier there is arranged at least one printed circuit board for connecting the output conductors, furthermore there is arranged, towards the row carrier in the area below the level of the upper base of the row carrier to the vertical wall of the row carrier, at least one means for stabilizing the power supply of the elementary pixel detector. The means for stabilizing the power supply is connected to the printed circuit board and is further connected with the connector of the electronics readout. The connector of the electronics readout is oriented below the row carrier. At the same time, between the row carrier, the means for power supply stabilization, and the detection segment holder there is formed at least one thermal bridge to eliminate temperature differences.

The means for power supply stabilization does not obstruct in a parallel arrangement of the individual modules together into larger continuous detection surfaces of the detectors, and at the same time the existing thermal bridge cancels the temperature difference between the means for power supply stabilization and the row carrier, including the holder of the detection segment. Equalizing the temperature differences using thermal bridges leads to a stabilization of the power supply and thus to a stabilization of the quality of the operation of the elements of the pixel detector. The rigid circuit board fulfills the role of electrical conductors, wherein it is dimensionally stable. This arrangement of the components of the module allows for the parallel or serial connection of the detection segments to the data bus of the electronics readout. Connecting a rigid circuit board with the means of power supply stabilization and with the connector of the data readout electronics for each individual segment of the detector allows for the data to be read in parallel from all segments simultaneously, thereby achieving a high speed of data acquisition from the detector composed of the modules.

The invention may be preferably adjusted so that the row carrier is formed in the shape of an "L" profile between the arms of which the segment holder is arranged. The holder extends over the upper base of the carrier, while the height of the printed circuit board is the same as the height of the overlap above the upper base. The holder is higher than the height difference between the arms of the "L" profile and extends above the upper base of the carrier. The height difference between the upper base of the carrier and the holder in the unoccupied surface of the base of the carrier is filled with a rigid printed circuit board. The printed circuit board and the row carrier make up an integral element, and the output conductors are more easily connectable to the printed circuit board. This arrangement makes it easier to place the modules together into a continuous detection surface.

In a preferred embodiment of the invention, the conductors of the read-out chip are mounted on a holder and are connected to the printed circuit board with wire connections. If the conductors are fixed to the segment holder, they do not tend to break while handling the detection segment, e.g. when assembling the module or when replacing a faulty segment. Soldering a wire connection is fast and cheap compared to forming an assembly consisting of male and female parts.

In another preferred embodiment of the invention, the printed circuit board is detachably fixed to the upper base, whereby from the point of fixation the printed circuit has, on at least part of its length, at least one flexible part led vertically downward to the means of power stabilization. The flexible part led vertically downward below the row carrier is also preferably used between the means of power stabilization and the connector of the readout electronics. The printed circuit board, due to its flexible part, may bend from its point of fixation over the edge of the row carrier and lead it along the wall of the row carrier vertically downward to the means of power supply stabilization. Using the flexible part of the printed circuit board for connecting to the connector of the readout electronics is preferable when organizing more modules to the detector with a large detector surface, where there is no excess space between the modules.

The invention also includes an ionizing radiation detector with a continuous detection surface composed of at least two detection segments arranged side by side with a clearance of up to 30 µm. The detector consists of at least one module arranged on the matrix including a row carrier which is formed by a longitudinal profile having a cross sectional shape of a square or rectangle. In the module, on at least part of the surface of the upper base of the row carrier, there are arranged exchangeable holders of the detection segments. The detection segment includes an elementary pixel detector consisting of a sensor layer arranged on the upper surface of the read-out chip while the read-out chip is fixed to the holder by at least part of its bottom surface. The rest of the bottom surface of the chip forms a projection extending beyond the upper base of the row carrier. The elementary pixel detector is equipped with at least two voltage conductors leading out from the side of the read-out chip to the upper base of the carrier for connecting the power supply and transmitting communication signals to the read-out electronics.

The summary of the invention consists in that the detection surface of the detector comprises at least one continuous row of at least two modules arranged side by side, wherein in each module there is arranged, in the unoccupied area of the upper base of the row carrier, at least one printed circuit board for connecting the voltage conductor. To the row carrier, in the area below the level of the upper base of the carrier at the vertical wall of the carrier, there is arranged at least one means for power supply stabilization of the elementary pixel detector which is connected to the printed circuit board, while at the same time the means for power supply stabilization is connected to at least one connector of the readout electronics. The connector of the readout electronics is spatially arranged below the row carrier, wherein between the means for power supply stabilization, the holders, and the row carrier there is formed at least one thermal bridge to eliminate temperature differences.

The detector in the form of a long continuous row has high detection speed, size independence, and a stability of power supply even when a large number of detection segments are used. Defective or operationally damaged components are easily exchangeable in the detector due to the modular construction.

In a preferred embodiment of the detector according to the invention, the row carrier of the module is formed in the shape of an "L" profile, between the arms of which there is arranged a holder which extends over the upper base of the carrier. Simultaneously, the height of the printed circuit board is the same as the height of overlap of the holder above the upper base.

The output conductors are arranged on the holder and are connected with the printed circuit board by conductor wires. The detector utilizing the "L" profile of the modules is easily assembled into a continuous row. The use of wire connections simplifies construction, is cheaper, and saves space for the printed circuit board.

In another preferred embodiment of the detector according to the invention, the printed circuit board is detachably fixed to the upper base, whereby the printed circuit board has at least one flexible part from the point of fixation on at least part of its length. The flexible part of the printed circuit board is led from the point of fixation of the printed circuit board to the upper base of the row carrier vertically downward direction to the means for power supply stabilization. At the same time, it is preferable if the printed circuit board, between the means for power supply stabilization and the connector of the electronics readout, is oriented vertically downward and is flexible in at least part of its length. The flexible part of the printed circuit board allows for its shaping as needed in the limited space between the individual modules arranged together into a continuous detection surface.

In a preferred embodiment of the detector according to the invention, the continuous rows of the modules are arranged in parallel next to each other into a continuous detection surface. Due to the parallel arrangement of continuous rows, it is possible to assemble a continuous surface in the shape of, for example, a square.

In another preferred embodiment of the detector according to the invention, the connectors of the data read-out electronics from the detection segments are connected to the readout electronics serially for the serial data reading from individual segments sequentially and/or parallel for the parallel reading of data from all detection segments simultaneously. Connecting the detection segments to read-out electronics is possible serially for applications with lower demands on imaging speed as well as in parallel for applications requiring the detector to work the fastest.

In a preferred embodiment of the detector, the row carriers are fastened to the thermally conductive matrix, which may be provided with a heat exchange circuit. The thermally conductive matrix regulates the temperature differences and the heat exchange circuit removes excess heat out of the detector.

In a preferred embodiment of the invention, the holders of the detection segments, the row carriers, and the thermally conductive matrix are made of aluminum or its alloys. Aluminum is a lightweight, stable, and easily accessible material with good thermal conductivity.

The module for the construction of an ionizing radiation detector allows for the assembly of detectors with an unlimitedly large detection surface. The modules can be arranged next to each other both in series and in parallel, the new arrangement of electrical conductors consisting of printed circuit boards resolves the problem of the lack of space between the modules. The detection segments in individual modules exhibit reliable operation due to the stable power supply, which is ensured by eliminating the temperature difference between the power supply and the detection segment. The arrangement of connections allows for the detection segments to be connected to the read-out electronics in the assembled detectors serially or in parallel. For detectors with a large surface, excess heat is dissipated away from the detector, so the operation of the detector need not be limited in any way.

CLARIFICATION OF THE DRAWINGS

The invention is more closely illustrated in the following drawings, in which.

Figure 4:
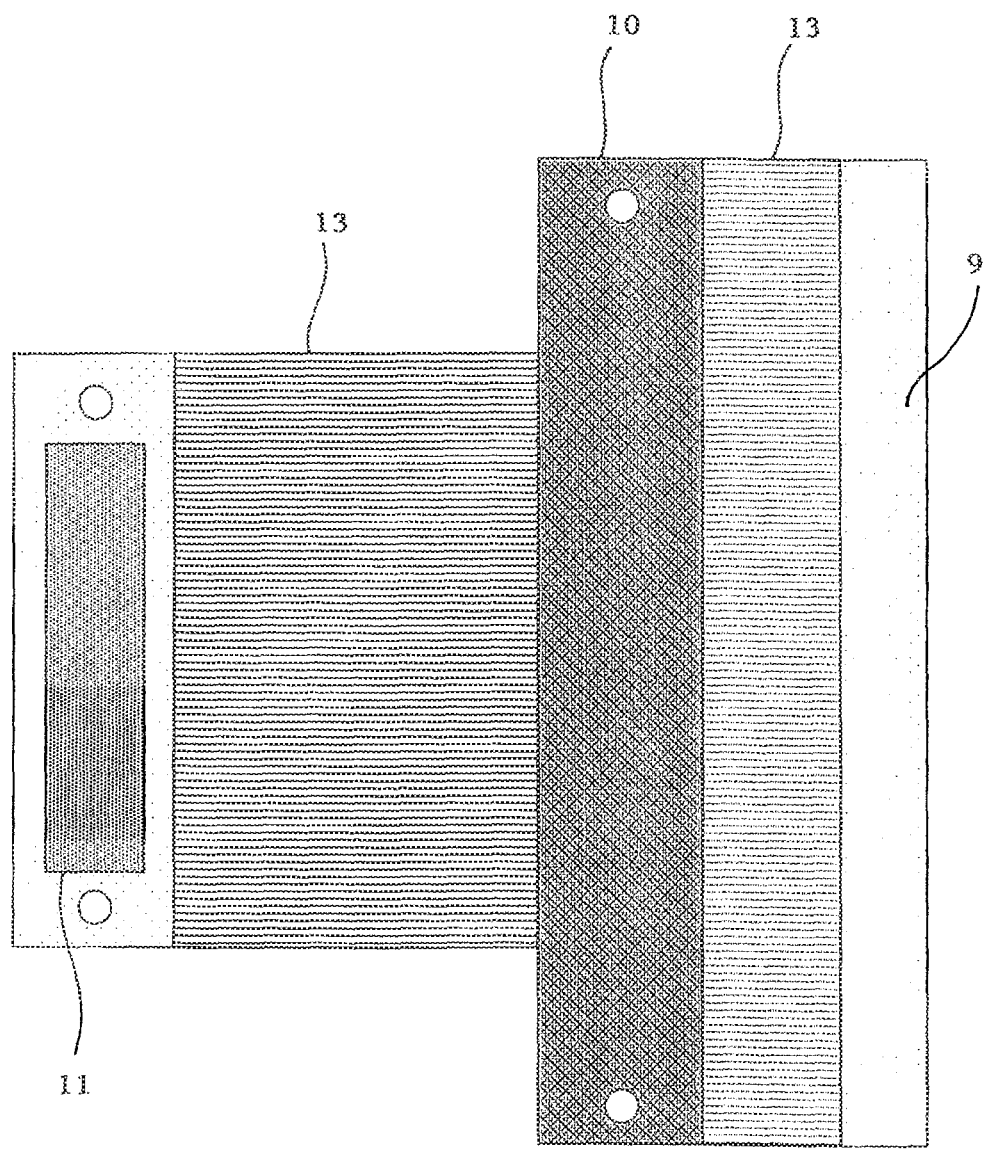
Figure 5:
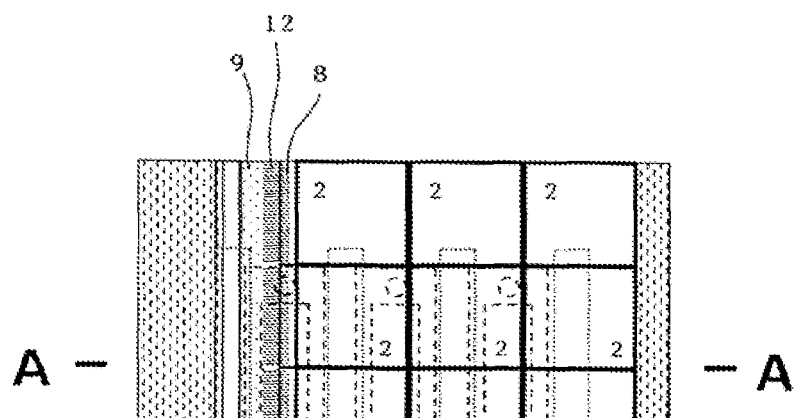
Figure 6:
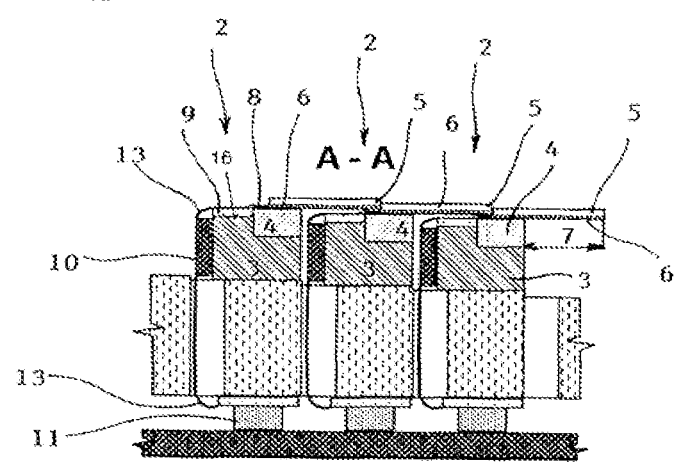
Figure 7:
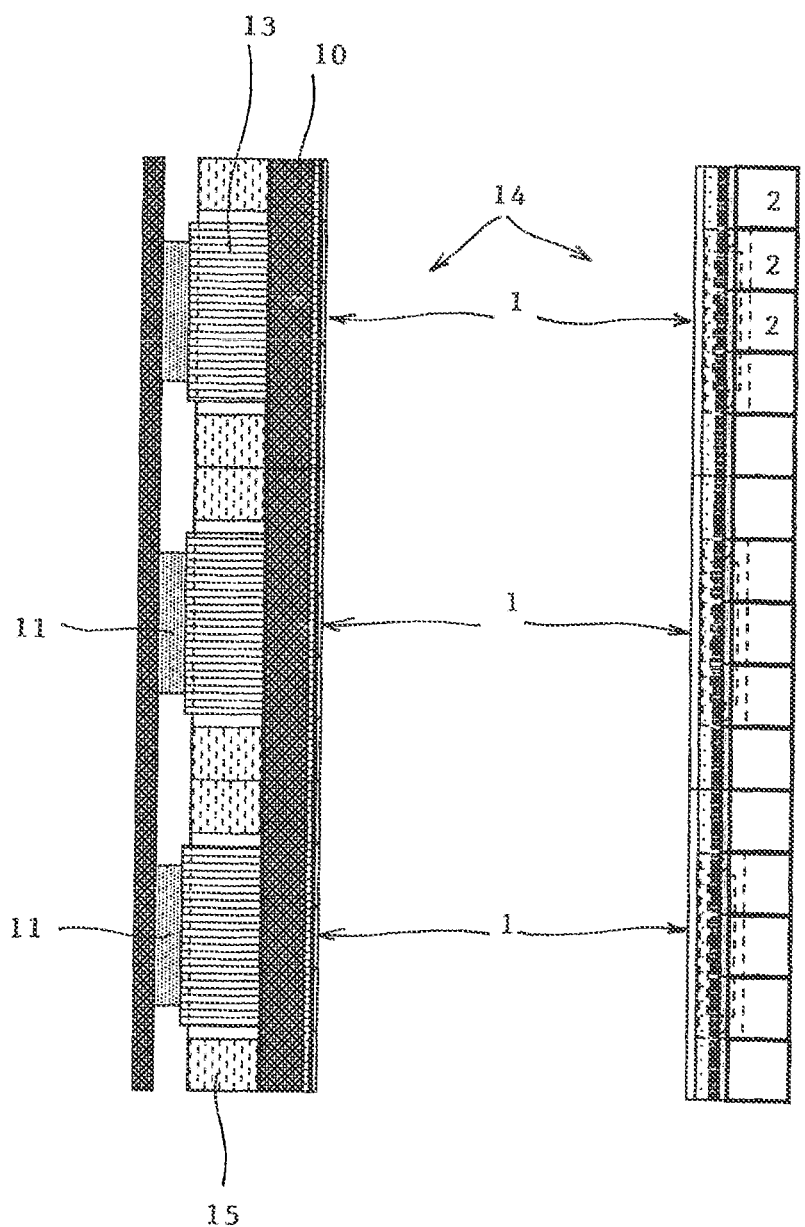
Figure 8:
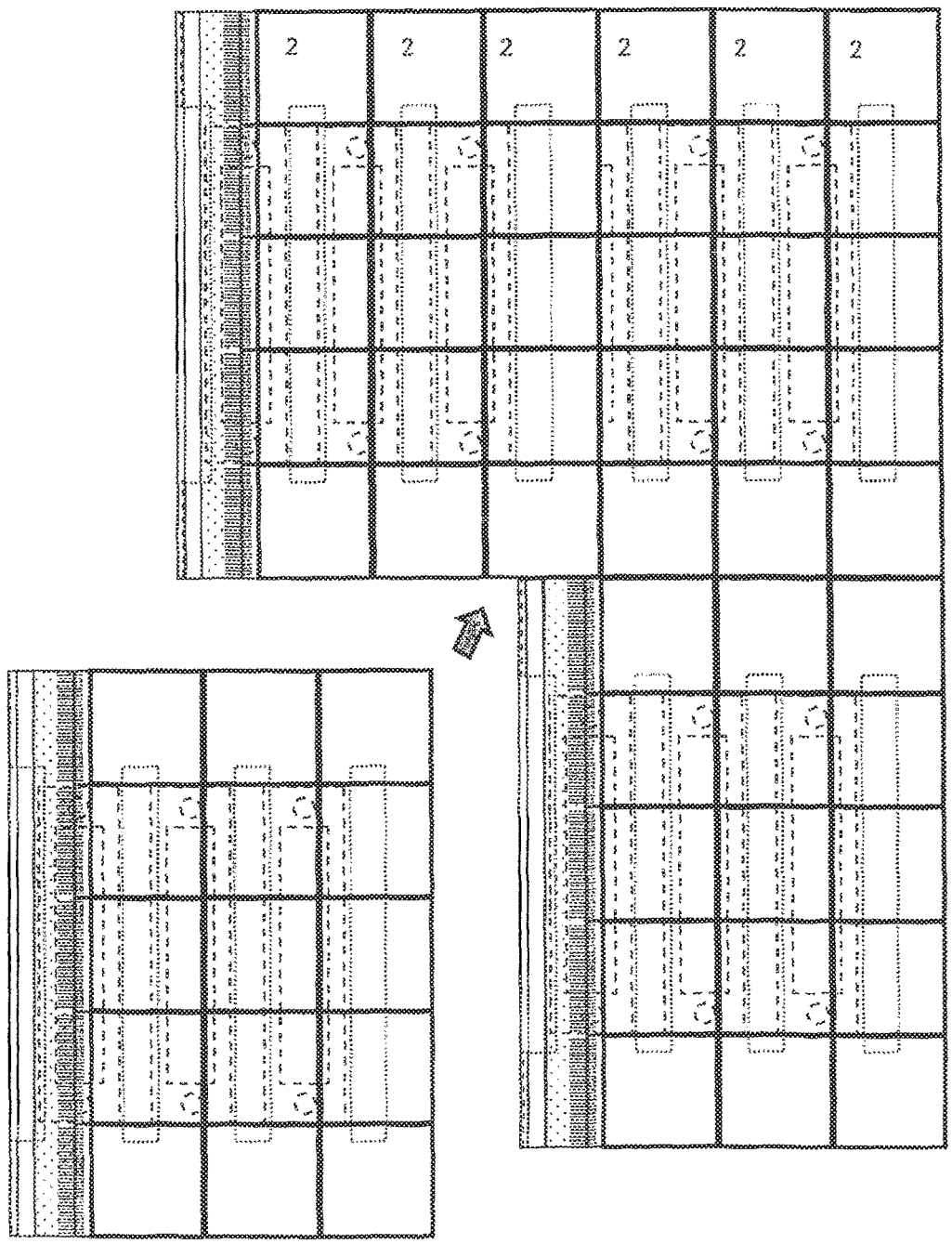

FIG. 4 shows a view of the unfolded connection of the rigid printed circuit board with the means for power supply stabilization and with the connector of the readout electronics, FIG. 5 shows a top view of a parallel assembly of three modules with five detection segments, FIG. 6 shows a sectional view of the parallel assembly of three modules, FIG. 7 shows a detector with a series assembly of three modules, FIG. 8 schematically shows an assembly of a large-surface detector.

EXAMPLES OF THE PREFERRED EMBODIMENTS OF THE INVENTION

It is understood that the hereinafter described specific examples of the realization of the invention are presented for illustrative purposes and not as a limitation of the examples of the realization of the invention to the cases shown herein. Experts who are familiar with the state of technology shall find, or using routine experimentation will be able to determine, a greater or lesser number of equivalents to the specific realizations of the invention which are specifically described here. These equivalents shall also be included into the scope of the following patent claims.

Figure 1:
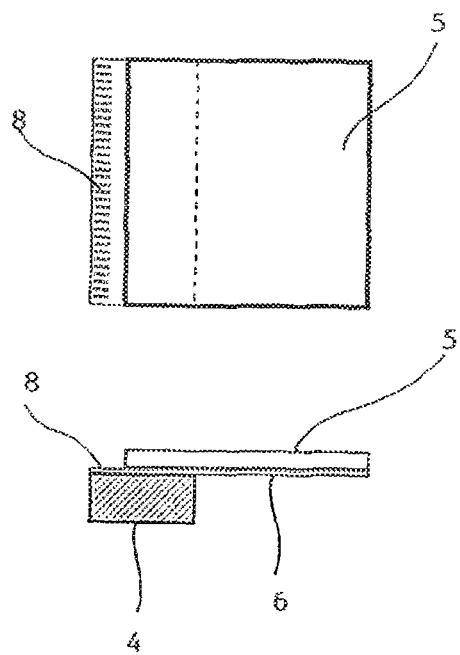
FIG. 1 shows a side view and a top view of the elementary pixel detector.

FIG. 1 shows a detection segment 2, used in the construction of modules 1 and detectors 14, which is on a part of its lower surface fastened to a bracket 4 of the segment 2. Thanks to this partial fastening, the overlap 2 of the detection segment 2 is well visible. The detection segment 2 is formed by a sensor layer 5 of material that reacts to the effects of ionizing radiation. The sensor layer 5 is attached to a read-out chip 6, which is a semiconductor component. The read-out chip 6 is able to register the response of the sensor layer 5 on the incident ionizing radiation on the individual pixels, into which the surface of the segment Z can be divided. Information about the incident ionizing radiation is transferred by electrical conductors 8. Electrical conductors 8 are led out from the side of the read-out chip 6 and there are at least two of them; one for supplying power, the second for transferring information in the form of voltage changes. The detection segment 2 is formed by e.g. a chip known under the name Timepix.

Figure 2:
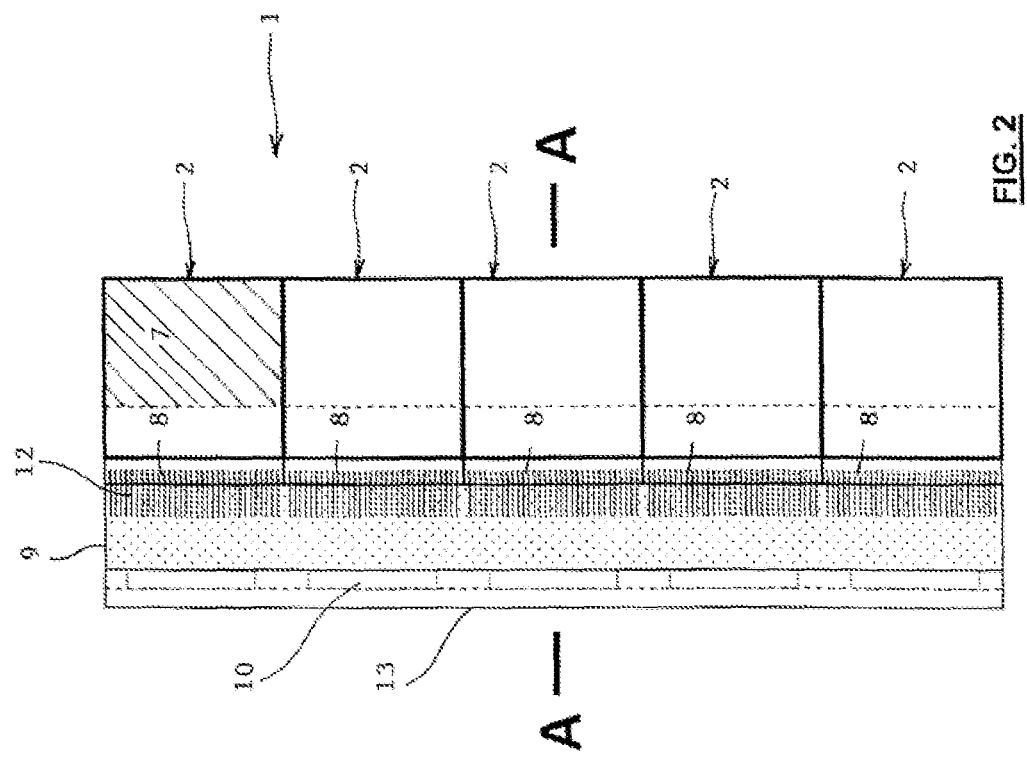
FIG. 2 shows a top view of one module of the detector.

FIG. 2 shows a module 1 comprising five detection segments 2 edgelessly arranged in a row. The segments 2 are orientated with the electrical conductors 8 on one side towards the printed circuit board 9, which is fixed to the row carrier 3 (not shown) and forms a continuous overlap 2 on the opposite side. The electrical conductors 8 are connected with the printed circuit board 9 by conductor wires 12 which can be secured by solder. The printed circuit board 9, in the vertically downward direction, has a bent flexible part 13 which leads to the means 10 for power supply stabilization. The printed circuit board 9 is formed by a combination of conductors printed onto a plastic backing which then passes into a series of electrical conductors hidden in waterproof sleeves to ensure the flexibility of the flexible part 13.

Figure 3:
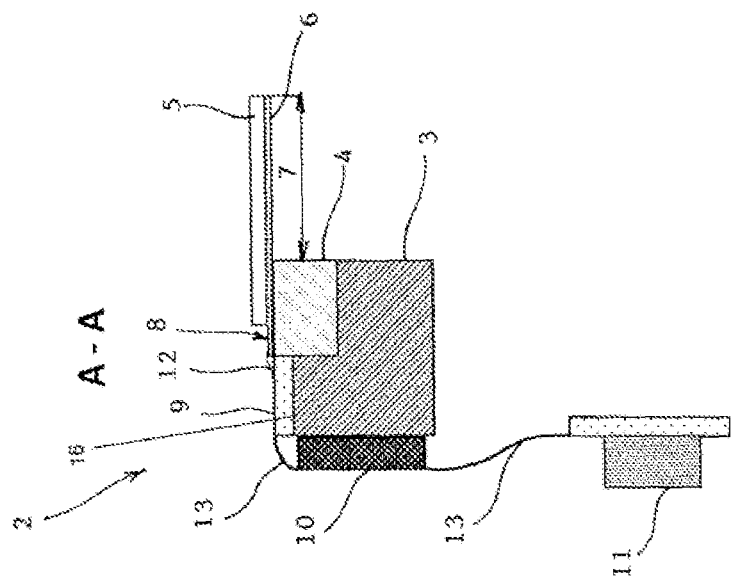
FIG. 3 shows a side sectional view of the detection segment.

FIG. 3 shows a cross-sectional view of the module 1 from FIG. 2, specifically one of the segments 2. The sensor layer 5 is displayed on the read-out chip 6, which, with overlap 7, is attached to the holder 4 of the segment 2 held in the row carrier 3 having a an "L" profile. The holder 4 is screwed to the carrier 3 and forms a height overlap compared to the upper base 16 of the carrier 3. The holder and the carrier are made of aluminum. In the resulting height difference there is fixed a printed circuit board 9 which compensates for the height difference. The electrical conductors 8 are directed towards the printed circuit board 9 and are connected by a wired connection 12. On the side of the row carrier 3 is a means 10 for power supply stabilization which is connected to the segment 2 by the flexible part 13 of the printed circuit board 9, which is bent vertically downwards. The flexible part 13 continues from the means 10 of power supply stabilization to the connector 11 of the read-out electronics. The connector 11 of the read-out electronics is located, in terms of spatial arrangement, below the row carrier 3.

FIG. 4 shows the printed circuit board 9 with unfolded flexible parts 13. The printed circuit board 9 is detachably fixed to the base of the row carrier 3. The flexible part 13 leads to the means 10 of power supply stabilization then continues to the connector 11 of the read-out electronics.

FIG. 5 shows a layout of modules 1 in parallel to each other in which three modules 1 are arranged together, each with five segments 2.

FIG. 6 shows a cross-section of the module 1 from FIG. 5. It can be seen how the overlaps 7 are utilized for covering the non-sensitive area of the upper base 16 of the row carrier 3 of each of the modules 1. Also shown is how the flexible parts 13 of the printed circuit boards 9 are led vertically downwards to avoid interfering and to allow for an independent stable power supply and connecting to the connector 11 for each of the segments 2.

FIG. 7 shows the detector 14 as a continuous row. The detector 14 is composed of three modules 1 fixed to the matrix 15.

FIG. 8 shows an assembly of modules 1 into a continuous detection surface of the detector 14. The modules 1 are lined up next to each other without being limited along the sides. The connectors 11 for the read-out electronics, means 10 for power supply stabilization, and flexible part 13 of the printed circuit board 9 are below the detection surface and below the row carriers 3, so they do not interfere with the assembly of modules 1 to each other.

The carriage of the modules 1 is secured by a matrix 15 which is made of thermally conductive material and is equipped with a heat exchange circuit. The heat transfer medium used in the circuit is water.

The read-out electronics can be arranged in serial mode for reading individual segments, which is slower, or to parallel reading mode when the detector speed is very high. It is also possible to set a region of interest within a large detector surface from which the detected radiation should be read.

INDUSTRIAL APPLICABILITY

The ionizing radiation detector module with continuous detection surface, and detectors assembled from modules according to the invention, shall find application in industry for testing the quality of products and materials, in the medical field, and in scientific applications.

OVERVIEW OF THE POSITIONS USED IN THE DRAWINGS

1 module for creating an ionizing radiation detector
2 detection segment
3 row carrier
4 detection segment holder
5 sensor layer
6 read-out chip
7 read-out chip overlap
8 output conductor of read-out chip
9 rigid printed circuit board
10 means for power supply stabilization
11 connector of read-out electronics
12 wire connection
13 flexible printed circuit board
14 detector—row
15 thermal transfer matrix

The invention claimed is:

1. A module for an ionizing radiation detector having at least two detection segments arranged side by side on a row carrier with clearance up to 30 µm for creating a continuous detection surface; the row carrier is formed by a longitudinal profile having a cross-sectional square or rectangular shape; on at least part of a surface of an upper base of the row carrier there are arranged holders, each holder for a respective detection segment out of a plurality of detection segments; each detection segment includes an elementary pixel detector consisting of a sensor layer arranged on an upper surface of a read-out chip; the read-out chip is fixed to a respective holder by at least a part of its lower surface and a rest of the lower surface of the chip forms an overlap extending beyond the upper base of the row carrier; the elementary pixel detector has at least two electrical conductors leading out from a side of the read-out chip on the upper base of the row carrier for connecting a power supply and transmitting communication signals to said read-out chip, wherein on an unoccupied area of the upper base of the row carrier there is arranged at least one printed circuit board for connecting output conductors and further, to the row carrier in an area below a level of the upper base of the row carrier at a vertical wall of the row carrier, there is arranged at least one means for power supply stabilization of the elementary pixel detector; the means for power supply stabilization is connected to the printed circuit board and simultaneously the means for power supply stabilization is connected to at least one connector of said read-out chip, which is spatially arranged below the row carrier, wherein between the means for power supply stabilization, the holders, and the row carrier there is formed at least one joint thermal conductive connection for eliminating temperature differences.

2. A module according to claim 1, wherein the row carrier is formed in a shape of an "L" profile, between arms of which there is arranged one of said holders which extends over said upper base of the row carrier, wherein a height of the printed circuit board is the same as a height of said overlap of the holder above the upper base.

3. A module according to claim 1, wherein the output conductors are arranged on the holder and are connected to the printed circuit board by wire connections.

4. A module according to claim 1, wherein the printed circuit board is detachably fixed to said upper base, wherein from a point of fixation the printed circuit board has, on at least part of its length, at least one flexible part.

5. A module according to claim 4, wherein the flexible part of the printed circuit board is led from a point of fixation of the printed circuit board on the upper base of said row carrier vertically downwards to the means for power supply stabilization.

6. A module according to claim 5, wherein the printed circuit board, between the means for power supply stabilization and the connector of the readout chip, is oriented vertically downward and is flexible along at least part of its length.

7. A module according to claim 1, wherein the holders are exchangeable holders.

8. A detector of ionizing radiation with a continuous detection surface formed by at least one module arranged on a matrix comprising a row carrier which is formed by a longitudinal profile having a cross-sectional shape of a square or rectangle, wherein on at least a part of said detection surface at an upper base of the row carrier there are arranged holders, each holder for a respective detection segment out of a plurality of detection segments; each detection segment comprises an elementary pixel detector consisting of a sensor layer arranged on an upper surface of a read-out chip, the read-out chip is fastened to a respective holder by at least a part of its lower surface and a rest of a lower surface of the chip, forming a projection extending outside a surface of the row carrier; the elementary pixel detector is equipped with at least two voltage conductors leading out from a side of the read-out chip on the upper base of the row carrier for connecting a power supply and transmitting communication signals to the read-out chip, wherein the detection surface of the detector comprises at least one continuous row of at least two modules arranged side by side, in which in each module, on an unoccupied surface of the upper base of the row carrier, there is arranged at least one printed circuit board for connecting output conductors and furthermore to the row carrier, in an area below a level of the upper base of the row carrier at a vertical wall of the row carrier, there is arranged at least one means for a power supply stabilization of the elementary pixel detector; the means for the power supply stabilization is connected to the printed circuit board, while simultaneously the means for the power supply stabilization is connected to at least one connector of the read-out chip which is spatially arranged below the row carrier, while between the means for the power supply stabilization, the holder, and the row carrier there is formed at least one joint thermal conductive connection for eliminating temperature differences.

9. A detector according to claim 8, wherein the row carrier of the module is formed in a shape of an "L" profile, between arms of which there is arranged said holder which extends over the upper base of the row carrier, while a height of the printed circuit board is the same as a height of an overlap of the holder above the upper base.

10. A detector according to claim 8, wherein the output conductors are arranged on said holder and are connected to the printed circuit board by wire connectors.

11. A detector according to claim 8, wherein the printed circuit board is detachably fixed to the upper base of the row carrier, while from a point of fixation the printed circuit board has, on at least a part of its length, at least one flexible part.

12. A detector according to claim 11, wherein the flexible part of the printed circuit board is led from the point of fixation of the printed circuit board to the upper base of the row carrier vertically downwards to the means for power supply stabilization.

13. A detector according to claim 12, wherein the printed circuit board, between the means for power supply stabilization and the connector of the read-out chip, is oriented vertically downward and is flexible in at least a part of its length.

14. A detector according to claim 8, wherein the continuous rows of modules are arranged in parallel next to each other into a continuous detector surface.

15. A detector according to claim 8, wherein the detection segments are connected to the read-out chip serially for a serial reading of data from individual detection segments successively, and/or in parallel for a parallel reading of data from all detection segments simultaneously.

16. A detector according to claim 8, wherein the matrix is thermally conductive and is provided with a heat exchange circuit.

17. A detector according to claim 8, wherein the holders of the detection segments, the row carrier, and a thermally conductive matrix are made of aluminum or any of its alloys.

18. A detector according to claim 8, wherein the holders are exchangeable holders.

* * * * *